(12) United States Patent
Chou et al.

(10) Patent No.: US 12,137,300 B2
(45) Date of Patent: Nov. 5, 2024

(54) DYNAMIC ADJUSTMENT METHOD AND SYSTEM FOR ADJUSTING FRAME PER SECOND

(71) Applicant: FLYTECH TECHNOLOGY CO., LTD., Taipei (TW)

(72) Inventors: Li-Chun Chou, Taipei (TW); Tien-Hsien Feng, Taipei (TW); Yu-Cheng Lin, Taipei (TW)

(73) Assignee: FLYTECH TECHNOLOGY CO., LTD., Taipei (TW)

( * ) Notice: Subject to any disclaimer, the term of this patent is extended or adjusted under 35 U.S.C. 154(b) by 122 days.

(21) Appl. No.: 18/087,928

(22) Filed: Dec. 23, 2022

(65) Prior Publication Data

US 2024/0022684 A1 Jan. 18, 2024

(30) Foreign Application Priority Data

Jul. 15, 2022 (TW) .................................. 111126742

(51) Int. Cl.
*H04N 7/01* (2006.01)
*H04N 23/951* (2023.01)

(52) U.S. Cl.
CPC ......... *H04N 7/0127* (2013.01); *H04N 23/951* (2023.01)

(58) Field of Classification Search
CPC .......................... H04N 7/0127; H04N 23/951
See application file for complete search history.

(56) References Cited

U.S. PATENT DOCUMENTS

| | | | | |
|---|---|---|---|---|
| 2005/0243183 | A1* | 11/2005 | Obrador | H04N 25/443 348/297 |
| 2008/0101466 | A1* | 5/2008 | Swenson | H04N 21/2404 375/240.07 |
| 2011/0298984 | A1* | 12/2011 | Schoenblum | H04N 19/86 348/607 |
| 2016/0019664 | A1* | 1/2016 | Hirakawa | G06Q 30/06 705/15 |

* cited by examiner

*Primary Examiner* — Sunghyoun Park
(74) *Attorney, Agent, or Firm* — Demian K. Jackson; Jackson IPG PLLC (57) ABSTRACT

The present invention relates to a dynamic adjustment method for adjusting a frame per second. The method includes steps of cyclically sampling a first image and a second image captured by an image capturing device based on a sampling time interval and uploading the first image and the second image to a server; executing an image variation rate algorithm on the server to acquire an image variation rate by comparing the first image with the second image; and adjusting the frame per second for the image capturing device to a first frame per second when all of the image variation rates within a first time window are less than a first threshold.

8 Claims, 4 Drawing Sheets

DYNAMIC ADJUSTMENT METHOD AND SYSTEM FOR ADJUSTING FRAME PER SECOND

CROSS-REFERENCE TO RELATED APPLICATION

This application claims priority benefit to Taiwan Invention Patent Application Serial No. 111126742, filed on Jul. 15, 2022, in Taiwan Intellectual Property Office, the entire disclosures of which are incorporated by reference herein.

FIELD

The present invention relates to a dynamic adjustment method and system for adjusting frame per second, in particular to a dynamic adjustment method and system for adjusting frame per second being capable of decreasing data flow of vidoes so to save the bandwidth.

BACKGROUND

In conventional technologies, the digital surveillance systems have been extensively deployed in a variety of venues that require security monitoring, such as, campuses, communities, building entrances and exits, public areas, etc. Typically a full set of digital surveillance system consists of a host computer and multiple digital monitors, in which the host computer communicatively connects and controls the digital monitors and the host computer is then communicatively connected to a remote system server through the Internet. All the surveillance videos filmed by the monitors is uploaded to the system server in real time for storage through the forwarding of the host computer. The system server provides for an authorized user to access and view these surveillance videos online through a browser, and, if necessary, allows users to download the critical videos to a user equipment.

However, since the surveillance videos has to be transmitted through the Internet to upload to the system server, a data volume for a surveillance video is subject to the network bandwidth and better to adapt to the available bandwidth for preventing from troubles, such as, the interruption of video transmission or the loss of critical segments incurred from the bandwidth congestion. Therefore, in many areas where the network bandwidth is relatively narrow or the network connection is unstable, in order to well upload the filmed video to the system server, the quality or the resolution in the surveillance video is usually quite limited. So in the state of the art, the surveillance systems are set to a lower level of resolution to avoid the above mentioned troubles.

The conventional surveillance systems are set up with a relatively lower frame per second, for example, with a fixed rate of 15 frames per second, to film the surveillance video. In terms of such filming conditions, if the target to be filmed is stationary or moving slowly, the surveillance video filmed with lower frame per second has a image quality that is barely acceptable. However, if the target to be filmed is a moving vehicle on the road or a moving object, the image filmed with a low frame per second becomes very blurred, and the features thereof are hardly recognized as well.

Hence, there is a need to solve the above deficiencies/issues.

SUMMARY

The present invention relates to a dynamic adjustment method and system for adjusting frame per second, in particular to a dynamic adjustment method and system for adjusting frame per second being capable of decreasing data flow of videos so to save the bandwidth.

Accordingly, the present invention provides a dynamic adjustment method for adjusting a frame per second. The method includes steps of: cyclically sampling a first image and a second image captured by an image capturing device based on a sampling time interval and uploading the first image and the second image to a server; executing an image variation rate algorithm on the server to acquire an image variation rate by comparing the first image with the second image; and adjusting the frame per second for the image capturing device to a first frame per second when all of the image variation rates within a first time window are less than a first threshold.

Preferably, the dynamic adjustment method further includes one of steps as follows: implementing an image sampling step to cyclically sample the first image and the second image captured by the image capturing device based on the sampling time interval and uploading the first image and the second image to a server via a transmission path comprising a communication transmission interface; implementing an image variation rate computation step to execute the image variation rate algorithm on the server to acquire the image variation rate of the first image with respect to the second image by comparing the first image with the second image; implementing a de-loading process to adjust the frame per second for the image capturing device to the first frame per second, when all of the image variation rates within the first time window are less than the first threshold; selectively implementing a first uploading process to adjust the frame per second for the image capturing device to the second frame per second, when all of the image variation rates within the second time window are greater than the second threshold; selectively implementing a second uploading process to adjust the frame per second for the image capturing device to the second frame per second, when the image variation rate within the second time window is greater than the second threshold; and adjusting the frame per second for the image capturing device to a second frame per second when all of the image variation rates within a first time window are greater than a second threshold.

The present invention further provides a dynamic adjustment system for adjusting a frame per second. The system includes: an image capturing device configured to cyclically sample a first image and a second image based on a sampling time interval; a server configured to receive the first image and the second image, execute an image variation rate algorithm to acquire an image variation rate by comparing the first image with the second image, and send a de-loading instruction to the image capturing device to render the frame per second for the image capturing device to be adjusted to a first frame per second when all of the image variation rates within a first time window are less than a first threshold.

Preferably, the dynamic adjustment system further includes one of: the image capturing device comprising a communication transmission interface; a system box receiving the first image and the second image transmitted from the image capturing device through the communication transmission interface; and the server connects with the system box through an internet transmission channel to receive the first image and the second image, execute the image variation rate algorithm to acquire the image variation rate of the first image with respect to the second image by comparing the first image with the second image, selectively send a first uploading instruction to the image capturing device to render the frame per second for the image capturing device to be adjusted to a second frame per second when all of the image variation rates within a first time window are greater than a second threshold, and selectively send a second uploading instruction to the image capturing device to render the frame per second for the image capturing device to be adjusted to a second frame per second when the image variation rate is greater than the second threshold.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

Figure 1:
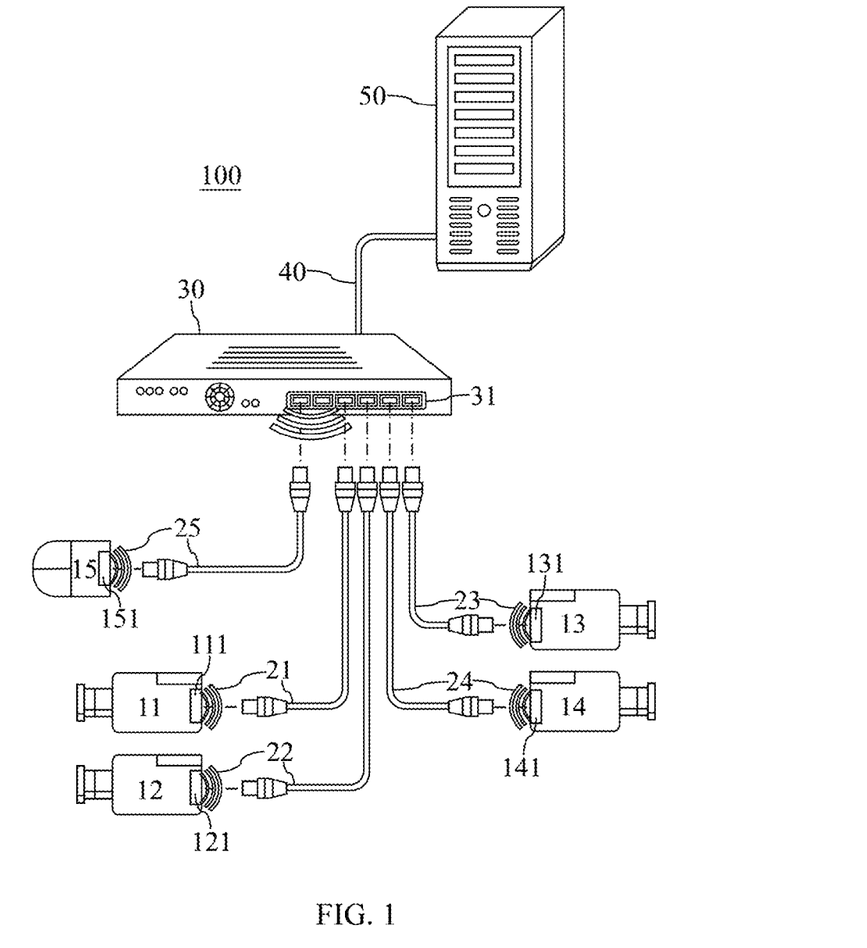
FIG. 1 is a system architecture schematic diagram illustrating a dynamic adjustment system for adjusting a frame per second according to the present invention.

FIG. 1 is a system architecture schematic diagram illustrating a dynamic adjustment system for adjusting a frame per second according to the present invention. The dynamic adjustment system for adjusting a frame per second 100 according to the present invention includes a plurality of image capturing devices 11-14, a system box 30 and a remote server 50. Each image capturing device 11-14 is connected to the system box 30 through a corresponding local area communication transmission channel 21-24 respectively. The system box 30 is further connected to the remote server 50 through an internet transmission channel 40. The image capturing devices 11-14 refer to any image capturing devices or any imaging devices that is capable of continuously capturing any stationary scenes or any dynamic scenes in front along the time axis and recording them to form an image or a video. Preferably, the dynamic adjustment system for adjusting a frame per second 100 is regarded as a network based surveillance video system as well.

Each image capturing device 11-14 at least includes a microcontroller (MCU), an image sensor such as a CMOS chip, a video compression (encoding) unit, and a second local area communication transmission interfaces 111, 121, 131, 141, etc. The video compression unit uses a video encoding standard that is selected from but not limited to: a DIVX standard, an AVI standard, a MJPGE standard, a MPEG-2 standard, a MPEG-4 standard, a MPEG-4.2 standard, a H.261 standard, a H.262 standard, a H.263 standard, a H.264 standard, a H.265 standard, a H.266 standard, etc., or some higher-level video encoding standards else to compress the video captured by the image sensor. Then, the compressed video data is sent back to the system box 30 for subsequently processing by the second local area communication transmission interfaces 111, 121, 131, and 141 through the local area communication transmission channels 21-24.

The system box 30 collects the videos captured by the plurality of image capturing devices 11-14, and serves as a image data hub for the time series based images for the entire system. The system box 30 at least includes a system-on-chip (SoC) module, a first local area communication transmission interface 31 and an internet communication interface inside. The system box 30 receives the compressed video data transmitted from the plurality of image capturing devices 11-14 by the first local area communication transmission interface 31 through the local area communication transmission channels 21-24.

The system box 30 is communicatively connected with the second local area communication transmission interfaces 111, 121, 131 and 141 and a third local area communication transmission interface 151 configured on the external devices, such as, the plurality of image capturing devices 11-14 and a peripheral device 15 by the first local area communication transmission interface 31 through the local area communication transmission channels 21-25. The peripheral device 15 is preferably but not limited to: a mouse, a keyboard, a touchpad, etc.

The first local area communication transmission interface 31, the second local area communication transmission interfaces 111, 121, 131, 141 and the third local area communication transmission interface 151 have and use the same communication standard, which is a wired transmission communication interface or a wireless transmission communication interface and preferably but not limited to: a universal serial bus (USB) 1.0 interface, a USB 1.1 interface, a USB 2.0 interface, a USB 3.0 interface, a USB 3.1 interface, a USB 3.2 interface, a USB4 interface, a USB Type-C interface, a Thunderbolt interface, a Thunderbolt 2 interface, a Thunderbolt 3 interface, a Thunderbolt 4 interface, a HDMI 1.1 interface, a HDMI 1.2 interface, a HDMI 1.3 interface, a HDMI 1.4 interface, a HDMI 2.0 interface, a HDMI 2.1 interface, a Wi-Fi 1 interface, a Wi-Fi 2 interface, a Wi-Fi 3 interface, a Wi-Fi 4 interface, a Wi-Fi 5 interface, a Wi-Fi 6 interface, a Bluetooth 2.0 interface, a Bluetooth 2.1 interface, a Bluetooth 3.0 interface, a Bluetooth 4.0 interface, a Bluetooth 4.1 interface, a Bluetooth 4.2 interface, a Bluetooth 5.0 interface, a Bluetooth 5.1 interface, a Bluetooth 5.2 interface, a Bluetooth 5.3 interface or a BLE interface, etc. Furthermore, the local area communication transmission channels 21-25 are preferably wired transmission channels or wireless transmission channels.

The first local area communication transmission interface 31 configured on the system box 30 is preferably a set of communication transmission interfaces including multiple ports. Each of the second local area communication transmission interfaces 111, 121, 131, 141 and the third local area communication transmission interface 151 is connected to one port configured on the system box 30 through the local area communication transmission channels 21-25 to communicatively connected with the first local area communication transmission interface 31. Thus, the overall bandwidth provided by the first local area communication transmission interface 31 is dynamically shared by the plurality of the second local area communication transmission interfaces 111, 121, 131, 141 and the third local area communication transmission interface 151 in common.

The SoC module provides the function of a gateway or a router to receive the compressed video data returned from multiple image capturing devices 11-14 and forward and upload the data to the remote server 50 for storage and record in queue through a wide area network (WAN) consisting of Internet based communication interface, such as, an Ethernet communication interface or a fiber-optic communication interface and through the corresponding Internet transmission channel 40. Meanwhile, the SoC module also forwards the control commands sent from the remote server 50 to the MCUs on the image capturing devices 11-14.

Although the video data is finally stored and backed up on the remote server 50, for the sake of data security and to avoid data loss due to temporary Internet disconnection, the system box 30 is usually equipped with a mechanical hard disk having an appropriate capacity acting as a temporary video data storage and a relay buffer during the data uploading process.

In normal conditions, each image capturing device 11-14 included in the dynamic adjustment system for adjusting a frame per second 100 continuously and ceaselessly execute the surveillance and filming tasks 24/7. Therefore, a large amount of compressed video data is constantly generated and required to be transmitted through the limited bandwidth provided by the first local area communication transmission interface 31 and shared by the multiple second local area communication transmission interfaces 111, 121, 131 and 141.

Thus, the data transmission rate, the data rate and the performance for the small local area network (LAN) established and organized by the first local area communication transmission interface 31, the second local area communication transmission interfaces 111, 121, 131, 141 and the third local area transmission interface 151 is determined according to the transmission bandwidth or the bit rate provided by the first local area communication transmission interface 31.

For instance, the hardware configuration included in one embodiment is that the first local area communication transmission interface 31 built in the system box 30 and the second local area communication transmission interfaces 111, 121, 131, 141 built in the plurality of image capturing devices 11-14 use the USB 2.0 transmission interface, and the video compression unit built in the plurality of image capturing devices 11-14 is not activated. Subject to the above hardware configuration, although the theoretical maximum bit rate for the high-speed USB 2.0 is up to 480 Mbps which is about 60 MB/s, the practical bit rate is approximately between 160 Mbps (about 20 MB/s) and 240 Mbps (about 30 MB/s).

The filming conditions for the image capturing devices 11-14 is set up as follows. For the CMOS chip inside, the frame per second (fps) is pre-set at 30 frames per second as well as the image resolution is pre-set at 1920×1080 (1080P). Subject to the filming condition, it is assumed that only two image capturing devices 11-12 are available and in operation and continuously and ceaselessly execute the surveillance and filming tasks 24/7. The two image capturing devices 11-12 constantly generate a continuous video data stream with a data rate about 300 Mbps per second (5 Mbps×30×2), and the data stream is constantly transmitted back to the system box 30 through the comply-shared bandwidth provided by a single set of USB 2.0 transmission interface configured on the first local area communication transmission interface 31. The above-mentioned video data stream has a data rate about 300 Mbps which exceeded the upper bound of the practical bit rate of the USB 2.0 transmission interface. Hence, even though only two image capturing devices are in operation, the data stream they generate has nearly occupied the overall bandwidth the first local area communication transmission interface 31 is able to provide.

In a video subject to the filming conditions of 1080P@30 fps filmed by the image capturing devices 11-14, the pixels for each component images are about 2 million (1920× 1080). Therefore, the video filmed with conditions of 1080P@30 fps has a quality that is approximately equivalent to an animation composed of multiple 2 million pixel images, which is much suitable for filming still life objects in a well lighting environment. However, for some cases, if one wants to film a video with a moving object as the major target, for example, to monitor the license plate on a moving vehicle, an scenario where people or vehicles move in and out, such as a parking lot or the entrance and exit of a store, or a large area that required to capture as much details as possible for surveillance purposes, the filming conditions of 1080P@30 fps may not be enough for making a good video. Usually, it has to re-set up a higher resolution or higher fps for the image capturing devices 11-14. For example, the resolution is preferably set to 4M or the fps is better to increase up to 60. In terms of the re-set filming condition, the issue is that even though only one single image capturing device 11 is in work and filming, the generated data stream still has the bit rate larger than the practical bandwidth of USB 2.0, therefore resulting in the trouble of insufficient transmission bandwidth.

Furthermore, although all video data are finally stored and backed up on the remote server 50, the storage capacity for the remote server 50 is not unlimited. It is assumed that a single image capturing device 11 continuously monitors and films for 24 hours with filming condition of 1080P@30 fps without encoding and compression. In the case, the image capturing device 11 generates a huge amount of data of about 1.5 TB per day to store in the remote server 50. If multiple image capturing devices 11-14 continuously monitor and film with the same filming condition for 24 hours continuously, a very huge amount of data of about 6 TB is generated and required to be stored on the remote server 50.

The data stored on the remote server 50 is usually divided into multiple data clusters that is then transferred to more different database servers for storage. As if the data backup is required, multiple times of data transfers are demanded. In the case of a huge amount of data, multiple times of data transfers will cause non-negligible usage consumption for the storage medium in the remote server 50. Therefore, if the amount of compressed video data is reduced, the times and frequencies of data transfers are straightforwardly decreased correspondingly, and the usage consumption of the remote server 50 is reduced correspondingly at the same time.

On the other hand, the image capturing devices 11-14 also adopts the multiple virtual channels scheme to perform the image process. For example, contents captured by each image capturing device 11-14 are sent to the video compression unit for encoding to generate two different sets of encoded videos, wherein one is preferably encoded in the format with, such as, MPEG-4, and another one is preferably encoded by, such as, the H.264 encoding standard. It causes a total of eight groups of encoded videos required to send back to the system box 30 through a single set of USB 2.0. It is assumed that the image capturing devices 11-14 continuously film with the same filming conditions of 1080P@30 fps. Then the data streams of the eight sets of encoded videos generated by the image capturing devices 11-14 have a bit rate that is far exceeding the upper bound of practical bandwidth of USB 2.0. In addition, a part of the bandwidth provided by the first local area communication transmission interface 31 is particularly reserved for the third local area communication transmission interface 151 that is priorly used for the control commands between the system box 30 or the remote server 50 and the image capturing devices 11-14.

As consumers have higher and higher requirements for the capability and image quality for the surveillance system, the development direction for the surveillance systems is shifted to deploy more and more image capturing devices to collaborate together to form an camera array to eliminate possible blind spots and try to enhance the quality of image up to, such as, 3M or 4M, etc. However, these advanced surveillance systems generate a huge amount of video data than ever before. Even if the image encoding technologies being capable of providing higher compression ratios and the higher-level local area communication transmission interfaces, such as, USB 3.0, other higher-level transmission interfaces, etc. are further introduced, the above-mentioned issue of the insufficient bandwidth still happened time by time.

The dynamic adjustment system for adjusting a frame per second according to the present invention effectively reduces the flow rate and the overall data volume for the compressed video data stream outputted from the image capturing device by implementing a dynamic adjustment method for adjusting a frame per second, so as to reduce the bit rate generated by these compressed video data, reduce the overall data stream volume transmitted in either LAN or WAN and release more bandwidth for both LAN and WAN at the same time. The method according to the present invention is preferably applied to but not limited to: a network-based surveillance video system, is used as a technology for saving video data stream to alleviate the issue of bandwidth congestion and allow individual image capturing devices to apply more higher level of filming conditions, and improves the overall performance for the entire system.

The dynamic adjustment system for adjusting a frame per second according to the present invention at least includes an image sampling step, an image variation rate computation step, a de-loading process, a first uploading process and a second uploading process. First, in the image sampling step, by the operation through the MCU, a sampling time interval, for example, 0.5 seconds, 1 second, 1.5 seconds, 2 seconds, etc., is set up for each image capturing devices 11-14, to command the image capturing devices 11-14 to particularly sample the image frames filmed by the CMOS at every time when the timing begins and fulfills the sampling time interval respectively, return the sampled image frames back to the system box 30, and upload them to the remote server 50. If the timing or time is yet to fulfill the sampling time interval, the image filmed by the CMOS is returned or selectively not returned back to the system box 30 and correspondingly is uploaded or selectively not uploaded them to the remote server 50. The sampling time interval is also referred to as as a sampling frequency or a sampling density.

In the image variation rate computation step, an image variation rate algorithm executable by the server processor has been pre-established on the remote server 50. The image variation rate algorithm is preferably to be implemented simply and quickly, and capable of quickly and cyclically computing the image difference between the image frames at the beginning and the end of the sampling time interval so to act as the image variation rate. The image variation rate algorithm is preferably based on but not limited to: an image subtraction scheme, a pixel subtraction scheme, an image difference computation scheme, an image comparison scheme, etc. After the image variation rate is obtained by performing the image variation rate algorithm, it is selectively to implement the de-loading process, the first uploading process or the second uploading process, depending upon the value of the image variation rate.

In the de-loading process, the image variation rate algorithm automatically determines, for a particular image capturing device, whether all of each image differences, the image variation rates, between the image frames at the beginning and the end of each sampling time intervals within a period of a continuous time window, such as, a continuous 1-minute period, a continuous 2-minute period or a continuous 3-minute period, are not exceeding a predetermined threshold, such as, 0.7%, 0.8%, 0.9%, 1.0%, 1.1%, 1.2%, 1.3%, 1.4%, 1.5% or 2%. For the particular image capturing device, when all of each image variation rates between the image frames at the beginning and the end of each sampling time intervals within the time window are not exceeding the predetermined threshold, the remote server 50 instantly sends out a de-loading command to the MCU in the particular image capturing device through a transmission path, to instruct the MCU to reduce fps and render the particular imaging capturing device entering into the de-loading status that has the low fps settings.

In the first uploading process, when an image capturing device enters into the de-loading status, the image variation rate algorithm automatically determines, for the particular image capturing device, whether all of each image differences, the image variation rates, between the image frames at the beginning and the end of each sampling time intervals within a period of a continuous time window, such as, a continuous 1-minute period, a continuous 2-minute period or a continuous 3-minute period, are contantly exceeding a predetermined threshold, such as, 0.7%, 0.8%, 0.9%, 1.0%, 1.1%, 1.2%, 1.3%, 1.4%, 1.5% or 2%. For the particular image capturing device, when all of each image variation rates between the image frames at the beginning and the end of each sampling time intervals within the time window are contantly exceeding the predetermined threshold, the remote server 50 instantly sends out a first uploading command to the MCU in the particular image capturing device through the transmission path, to instruct the MCU to increase fps and render the particular imaging capturing device entering into the first uploading status that has the high fps settings. The execution of the first uploading process is selectively symmetrical or asymmetrical to the execution of the de-loading process.

In the second uploading process, when an image capturing device enters into the de-loading status, the image variation rate algorithm automatically determines, for the particular image capturing device, whether one of each image variation rates between the image frames at the beginning and the end of each sampling time intervals within the time window is exceeding a predetermined threshold. For the particular image capturing device, once the image variation rate algorithm determines one of each image variation rates between the image frames at the beginning and the end of each sampling time intervals within the time window is exceeding the predetermined threshold, the remote server 50 instantly sends out a second uploading command to the MCU in the particular image capturing device through the transmission path, to instruct the MCU to increase fps and render the particular imaging capturing device entering into the second uploading status that has the high fps settings. The time window, threshold value and fps applied in the de-loading process, the first uploading process and the second uploading process are the same or selectively different.

Figure 2:
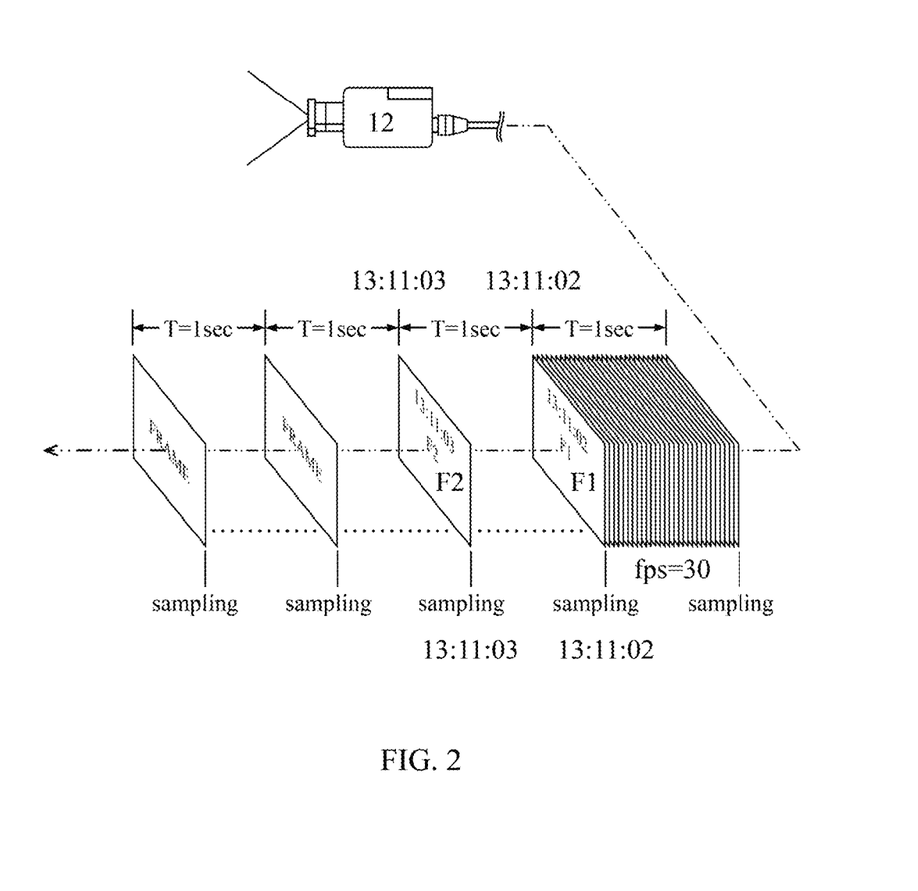
FIG. 2 is a schematic diagram illustrating an embodiment of the image sampling step included in the dynamic adjustment method for adjusting a frame per second according to the present invention.

FIG. 2 is a schematic diagram illustrating an embodiment of the image sampling step included in the dynamic adjustment method for adjusting a frame per second according to the present invention. In one embodiment, for example, in the image sampling step, the initial fps for the image capturing device 12 in the local end is set up to 30, as well as the sampling time interval T is set up to 1 second. Alternatively, the sampling time interval T is set to other values, such as, 1.5 seconds, according to actual demands, as well as the image sampling is set up to begin sampling process since 13:11:02. When the current time arrives the time node at 13:11:02, the image capturing device 12 captures the first image F1 filmed by the CMOS at 13:11:02, and uploads it to the remote server 50 through the transmission path at least containing the second local area communication transmission interfaces 111, 121, 131, 141, the system box 30 and the internet transmission channel 40. Then after a time interval of 1 second elapsed and when the time arrives the time node at 13:11:03, the second image F2 filmed by the CMOS at 13:11:03 is sampled again, and uploaded to the remote server 50 through the transmission path. In this way, the image frames filmed by the CMOS in every second are cyclically sampled and repeatedly uploaded to the remote server 50.

In the subsequent image variation rate computation step and de-loading process, the time window of the image variation rate algorithm included in remote server 50 is set up to 1 minute, as well as the threshold is set up to 1%. The image variation rate algorithm checks whether all of each the 59 image variation rates sourced from the image capturing device 12 within the 1-minute time window, that is, within a time period lasting from 13:11:02 to 13:12:02, are not exceeding the threshold of 1%. If it is the case, that is all of each the 59 image variation rates are lower than 1%, the remote server 50 sends out a de-loading command to the image capturing device 12 via the transmission path, instructs its MCU to reduce the fps, for example, from 30 fps down to 15 fps, and render the image capturing device 12 entering into the de-loading status since 13:12:02.

If the image capturing device 12 is communicatively connected to the system box 30 by using the USB 2.0 transmission interface, when the image capturing device 12 enters into the de-loading status, at least ½ or more bandwidth of the USB 2.0 transmission interface is released, which implies that the other image capturing devices 11 and 13-14 are allowed to apply higher resolution or fps value. If the image capturing device 12 is contantly in a de-loading status of 1080P@15 fps for 24 consecutive hours, the amount of data recorded on the remote server 50 is correspondingly reduced to 0.75 TB.

In one embodiment, in the first uploading process, when an image capturing device is currently in a de-loading status, the image variation rate algorithm continuously executes the image sampling step, and automatically determines whether all of the 59 image variation rates sourced from the image capturing device 12 within the 1-minute time window lasting from 13:11:02 to 13:12:02 are exceeding the threshold of 1%. If it is the case, that is all of each the 59 image variation rates are larger than 1%, the remote server 50 sends out a first uploading command to the image capturing device 12 via the transmission path, to instruct its MCU to adjust the fps, for example, from 15 fps up to 30 fps, and render the image capturing device 12 entering into the first uploading status. The time window and threshold used in in the first uploading process are alternatively set to other values, such as, 2 minutes and 1.1% respectively, according to actual demands, and unnecessary to have the same values with values of the time window and threshold used in the de-loading process.

Figure 3:
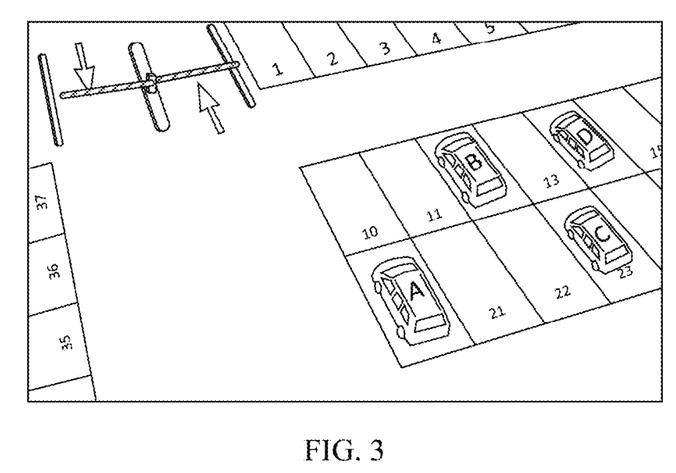
FIG. 3 is a schematic diagram illustrating an image frame filmed by the image capturing device according to the present invention when the time arrives 13:53:48.
Figure 4:
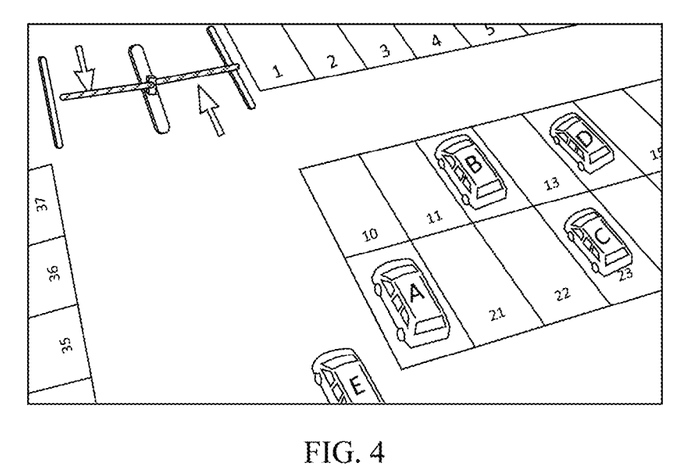
FIG. 4 is a schematic diagram illustrating an image frame filmed by the image capturing device according to the present invention when the time arrives 13:53:49.

FIG. 3 is a schematic diagram illustrating an image frame filmed by the image capturing device according to the present invention when the time arrives 13:53:48. FIG. 4 is a schematic diagram illustrating an image frame filmed by the image capturing device according to the present invention when the time arrives 13:53:49. In one embodiment, in the second uploading process, the image capturing device 12 is preferably a surveillance monitor configured in a parking lot. After the image capturing device 12 entered into the de-loading status since 13:12:02, until the time arrived 13:53:48, in this continuous period of 41 minutes and 46 seconds, all of the image variation rates obtained by comparing the image frames at the beginning and the end of each sampling time interval of 1 second are less than and not exceeding 1%. It implies that the contents of all the images filmed by the image capturing device 12 since 13:12:02 to 13:53:48 have no apparent change and are probably the same as those filmed by the image capturing device 12 when the time arrived 13:53:48, as shown in FIG. 3.

However, between the time of 13:53:48 and the time of 13:53:49, a vehicle E drives fast into the field of view (FoV) of the image capturing device 12 and appears in the image frame filmed by the image capturing device 12 at the time node of 13:53:49, as shown in FIG. 4. When the image frame at 13:53:49 is uploaded to the remote server 50, the image variation rate algorithm compares the image frame at time node of 13:53:48 with the image frame at time node of 13:53:49, and the computed image variation rate is 1.4%, which is larger than and exceeding the threshold of 1%. The remote server 50 immediately send out a second uploading command to the MCU configured on the image capturing device 12 via the transmission path, to instruct the MCU to adjust the fps to 60, for example, from 15 fps up to 60 fps, for the image capturing device 12. The image capturing device 12 enters into the second uploading status to avoid missing the critical images due to the low fps setting. The second uploading process is also regarded as an embodiment, in which the time window is set to 1 second, of the first uploading process.

The frame per second (fps) included in the dynamic adjustment method and system for adjusting a frame per second according to the present invention is free to set into various commonly used fps values according to different application scenarios, not limited to specific values, and preferably but not limited to: 5, 10, 15, 24, 25, 30, 50, 60 or other suitable fps values.

Preferably, the first uploading process is less sensitive to the image variation because the image variation rate algorithm requires multiple confirmations for image variations prior to adjusting the fps, and is more suitable for applying to an environment with less security risks, an environment with less moving objects, or an environment easy to cause the system to misjudge, such as, a windy environment, a sandy environment and a deciduous environment.

Preferably, the second uploading process is sensitive to the image variation because the image variation rate algorithm directly adjusts the fps in response to any significant image variation between image frames, and is more suitable for applying to an environment with more security threats, and an environment full of more moving objects.

Figure 5:
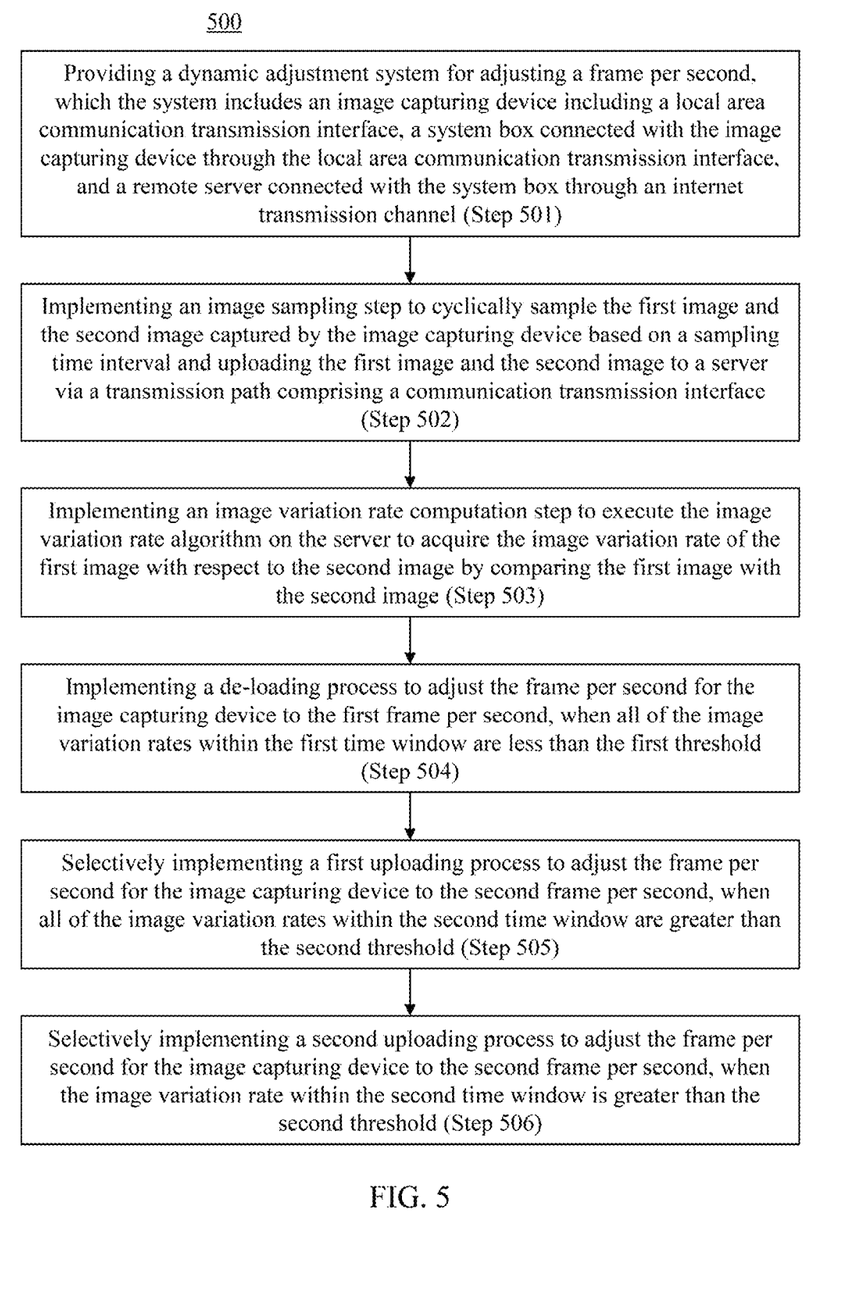
FIG. 5 is a flow chart showing the implementation steps of the dynamic adjustment method for adjusting a frame per second according to the present invention.

FIG. 5 is a flow chart showing the implementation steps of the dynamic adjustment method for adjusting a frame per second according to the present invention. To sum up, the dynamic adjustment method 500 for adjusting a frame per second according to the present invention preferably includes but not limited to the following steps: providing a dynamic adjustment system for adjusting a frame per second, which the system includes an image capturing device including a local area communication transmission interface, a system box connected with the image capturing device through the local area communication transmission interface, and a remote server connected with the system box through an internet transmission channel (Step 501); implementing an image sampling step to cyclically sample the first image and the second image captured by the image capturing device based on a sampling time interval and uploading the first image and the second image to a server via a transmission path comprising a communication transmission interface (Step 502); implementing an image variation rate computation step to execute the image variation rate algorithm on the server to acquire the image variation rate of the first image with respect to the second image by comparing the first image with the second image (Step 503); implementing a de-loading process to adjust the frame per second for the image capturing device to the first frame per second, when all of the image variation rates within the first time window are less than the first threshold (Step 504); selectively implementing a first uploading process to adjust the frame per second for the image capturing device to the second frame per second, when all of the image variation rates within the second time window are greater than the second threshold (Step 505); and selectively implementing a second uploading process to adjust the frame per second for the image capturing device to the second frame per second, when the image variation rate within the second time window is greater than the second threshold (Step 506).

The technology for dynamically adjusting a frame per second according to the present invention is aimed to reduce the consumption of the bandwidth in USB 2.0 that is connected with and used by the camera or camera module, and reduce the times and frequencies of data transfers on a server end for data backup.

The technology according to the present invention is applicable to a camera module configured in venues with lower flow of people or lower traffic, that is, a location where the variation among component images is relatively lower, for example, a warehouse, a parking lot, an emergency exit, a staff lounge, other public areas, etc.

The dynamic adjustment technology according to the present invention uses the image recognition processing technique, by collecting images filmed by the cameras and upload them to the cloud server for computation. The technology performs the image sampling at a pre-determined fixed time node in the video clips for comparison. The sampling interval among the time nodes is free to adjust on demand. When the variation of the image frame exceeds, for example, 1% or less or more, the system automatically determines that there is an object moving or changing in the image and the value of frame per second is increased correspondingly.

The method is performed as follows, for example, dividing a video into multiple images and then sampling images at a pre-determined fixed time node for comparison. If there is no apparent variation or change in the video lasting for 1 minute, after computing, the server sends an instruction to a specified camera connected to the system box to perform the de-loading process. The duration of lasting time is adjustable depending upon the situation.

The de-loading process is to adjust the fps from 30 down to 15 or even lower for the H.264/MJPEG image processing format. That is the filming condition is varied from the original 30 images filmed per second down to 15 images filmed per second. Therefore, at least ½ or more of the bandwidth for the USB 2.0 transmission interface is released.

When there is none of change in the video image for a period of time, it is apparent the video contents captured by the camera have no significant value. So it causes no security flaws for the entire surveillance system to reduce fps. Nevertheless, once the system detects a significant change occurring in the video contents, the system switches back to a higher video refresh rate to capture the critical images.

There are further embodiments provided as follows.

Embodiment 1: A dynamic adjustment method for adjusting a frame per second which includes: cyclically sampling a first image and a second image captured by an image capturing device based on a sampling time interval and uploading the first image and the second image to a server; executing an image variation rate algorithm on the server to acquire an image variation rate by comparing the first image with the second image; and adjusting the frame per second for the image capturing device to a first frame per second when all of the image variation rates within a first time window are less than a first threshold.

Embodiment 2: The dynamic adjustment method as described in Embodiment 1 further includes one of: implementing an image sampling step to cyclically sample the first image and the second image captured by the image capturing device based on the sampling time interval and uploading the first image and the second image to a server via a transmission path comprising a communication transmission interface; implementing an image variation rate computation step to execute the image variation rate algorithm on the server to acquire the image variation rate of the first image with respect to the second image by comparing the first image with the second image; implementing a de-loading process to adjust the frame per second for the image capturing device to the first frame per second, when all of the image variation rates within the first time window are less than the first threshold; selectively implementing a first uploading process to adjust the frame per second for the image capturing device to the second frame per second, when all of the image variation rates within the second time window are greater than the second threshold; selectively implementing a second uploading process to adjust the frame per second for the image capturing device to the second frame per second, when the image variation rate within the second time window is greater than the second threshold; and adjusting the frame per second for the image capturing device to a second frame per second when all of the image variation rates within a first time window are greater than a second threshold.

Embodiment 3: The dynamic adjustment method as described in Embodiment 1, the first frame per second and the second frame per second are selected from one of 5 seconds, 10 seconds, 15 seconds, 20 seconds, 24 seconds, 25 seconds, 30 seconds, 50 seconds and 60 seconds, and the image variation rate algorithm is based upon one of an image subtraction scheme, a pixel subtraction scheme, an image difference computation scheme and an image comparison scheme.

Embodiment 4: The dynamic adjustment method as described in Embodiment 1, the sampling time interval are a fixed time interval or a variable time interval; the sampling time interval is selected from one of 0.5 second, 1 second, 1.5 seconds and 2 seconds; the first time window and the second time window are selected from one of continuous 1 minute, continuous 2 minutes and continuous 3 minutes; and the first threshold and the second threshold are selected from one of 0.7%, 0.8%, 0.9%, 1.0%, 1.1%, 1.2%, 1.3%, 1.4%, 1.5% and 2%.

Embodiment 5: The dynamic adjustment method as described in Embodiment 1, the transmission path comprises the communication transmission interface, a system box and an internet transmission channel, the image capturing device connects with the system box through the communication transmission interface to receive the first image and the second image, and the server connects with the system box through the internet transmission channel to receive the first image and the second image.

Embodiment 6: A dynamic adjustment system for adjusting a frame per second which includes: an image capturing device configured to cyclically sample a first image and a second image based on a sampling time interval; a server configured to receive the first image and the second image, execute an image variation rate algorithm to acquire an image variation rate by comparing the first image with the second image, and send a de-loading instruction to the image capturing device to render the frame per second for the image capturing device to be adjusted to a first frame per second when all of the image variation rates within a first time window are less than a first threshold.

Embodiment 7: The dynamic adjustment system as described in Embodiment 6 further includes one of: the image capturing device comprising a communication transmission interface; a system box receiving the first image and the second image transmitted from the image capturing device through the communication transmission interface; and the server connects with the system box through an internet transmission channel to receive the first image and the second image, execute the image variation rate algorithm to acquire the image variation rate of the first image with respect to the second image by comparing the first image with the second image, selectively send a first uploading instruction to the image capturing device to render the frame per second for the image capturing device to be adjusted to a second frame per second when all of the image variation rates within a first time window are greater than a second threshold, and selectively send a second uploading instruction to the image capturing device to render the frame per second for the image capturing device to be adjusted to a second frame per second when the image variation rate is greater than the second threshold.

Embodiment 8: The dynamic adjustment system as described in Embodiment 7, the first image and the second image are uploaded to the server through a transmission path comprising the communication transmission interface, the system box and an internet transmission channel.

Embodiment 9: The dynamic adjustment system as described in Embodiment 7, the communication transmission interface is selected from one of a USB 1.0 transmission interface, a USB 1.1 transmission interface, a USB 2.0 transmission interface, a USB 3.0 transmission interface, a USB 3.1 transmission interface, a USB 3.2 transmission interface, a USB4 transmission interface, a USB Type C transmission interface, a Thunderbolt transmission interface, a Thunderbolt 2 transmission interface, a Thunderbolt 3 transmission interface, a Thunderbolt 4 transmission interface, a HDMI 1.1 transmission interface, a HDMI 1.2 transmission interface, a HDMI 1.3 transmission interface, a HDMI 1.4 transmission interface, a HDMI 2.0 transmission interface, a HDMI 2.1 transmission interface, a Wi-Fi 1 transmission interface, a Wi-Fi 2 transmission interface, a Wi-Fi 3 transmission interface, a Wi-Fi 4 transmission interface, a Wi-Fi 5 transmission interface, a Wi-Fi 6 transmission interface, a Bluetooth 2.0 transmission interface, a Bluetooth 2.1 transmission interface, a Bluetooth 3.0 transmission interface, a Bluetooth 4.0 transmission interface, a Bluetooth 4.1 transmission interface, a Bluetooth 4.2, a Bluetooth 5.0 transmission interface, a Bluetooth 5.1 transmission interface, Bluetooth 5.2 transmission interface, a Bluetooth 5.3 transmission interface and a BLE transmission interface.

Embodiment 10: The dynamic adjustment system as described in Embodiment 6, the image capturing device further includes a video compression unit to compress the first image and the second image, wherein the video compression unit adopts one of a DIVX video encoding standard, an AVI video encoding standard, a MJPGE video encoding standard, a MPEG-2 video encoding standard, a MPEG-4 video encoding standard, a MPEG-4.2 video encoding standard, a H.261 video encoding standard, a H.262 video encoding standard, a H.263 video encoding standard, a H.264 video encoding standard, a H.265 video encoding standard and a H.266 video encoding standard to encode the first image and the second image.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A dynamic adjustment method for adjusting a frame per second, comprising:
   cyclically sampling a first image and a second image captured by an image capturing device based on a sampling time interval and uploading the first image and the second image to a server;
   executing an image variation rate algorithm on the server to acquire an image variation rate by comparing the first image with the second image; and
   adjusting the frame per second for the image capturing device to a first frame per second when all of the image variation rates within a first time window are less than a first threshold,
   wherein the dynamic adjustment method for adjusting a frame per second further comprises one of:
      implementing an image sampling step to cyclically sample the first image and the second image captured by the image capturing device based on the sampling time interval and uploading the first image and the second image to a server via a transmission path comprising a communication transmission interface;
      implementing an image variation rate computation step to execute the image variation rate algorithm on the server to acquire the image variation rate of the first image with respect to the second image by comparing the first image with the second image;
      implementing a de-loading process to adjust the frame per second for the image capturing device to the first frame per second, when all of the image variation rates within the first time window are less than the first threshold;
      selectively implementing a first uploading process to adjust the frame per second for the image capturing device to the second frame per second, when all of the image variation rates within a second time window are greater than a second threshold;
      selectively implementing a second uploading process to adjust the frame per second for the image capturing device to the second frame per second, when the image variation rate within the second time window is greater than the second threshold; and
      adjusting the frame per second for the image capturing device to a second frame per second when all of the image variation rates within the first time window are greater than the second threshold.

2. The dynamic adjustment method as claimed in claim 1, wherein the first frame per second and the second frame per second are selected from one of 5 seconds, 10 seconds, 15 seconds, 20 seconds, 24 seconds, 25 seconds, 30 seconds, 50 seconds and 60 seconds, and the image variation rate algorithm is based upon one of an image subtraction scheme, a pixel subtraction scheme, an image difference computation scheme and an image comparison scheme.

3. The dynamic adjustment method as claimed in claim 1, wherein the sampling time interval are a fixed time interval or a variable time interval, the sampling time interval is selected from one of 0.5 second, 1 second, 1.5 seconds and 2 seconds, the first time window and the second time window are selected from one of continuous 1 minute, continuous 2 minutes and continuous 3 minutes, and the first threshold and the second threshold are selected from one of 0.7%, 0.8%, 0.9%, 1.0%, 1.1%, 1.2%, 1.3%, 1.4%, 1.5% and 2%.

4. The dynamic adjustment method as claimed in claim 1, wherein the transmission path comprises the communication transmission interface, a system box and an internet transmission channel, the image capturing device connects with the system box through the communication transmission interface to receive the first image and the second image, and the server connects with the system box through the internet transmission channel to receive the first image and the second image.

5. A dynamic adjustment system for adjusting a frame per second, comprising:
   an image capturing device configured to cyclically sample a first image and a second image based on a sampling time interval; and
   a server configured to receive the first image and the second image, execute an image variation rate algorithm to acquire an image variation rate by comparing the first image with the second image, and send a de-loading instruction to the image capturing device to render the frame per second for the image capturing device to be adjusted to a first frame per second when all of the image variation rates within a first time window are less than a first threshold,
   wherein the dynamic adjustment system for adjusting a frame per second further comprises one of:
      the image capturing device comprising a communication transmission interface;
      a system box receiving the first image and the second image transmitted from the image capturing device through the communication transmission interface; and
      the server connects with the system box through an internet transmission channel to receive the first image and the second image, execute the image variation rate algorithm to acquire the image variation rate of the first image with respect to the second image by comparing the first image with the second image, selectively send a first uploading instruction to the image capturing device to render the frame per second for the image capturing device to be adjusted to a second frame per second when all of the image variation rates within the first time window are greater than a second threshold, and selectively send a second uploading instruction to the image capturing device to render the frame per second for the image capturing device to be adjusted to a second frame per second when the image variation rate is greater than the second threshold.

6. The dynamic adjustment system as claimed in claim 5, wherein the first image and the second image are uploaded to the server through a transmission path comprising the communication transmission interface, the system box and an internet transmission channel.

7. The dynamic adjustment system as claimed in claim 5, wherein the communication transmission interface is selected from one of a USB 1.0 transmission interface, a USB 1.1 transmission interface, a USB 2.0 transmission interface, a USB 3.0 transmission interface, a USB 3.1 transmission interface, a USB 3.2 transmission interface, a USB4 transmission interface, a USB Type C transmission interface, a Thunderbolt transmission interface, a Thunderbolt 2 transmission interface, a Thunderbolt 3 transmission interface, a Thunderbolt 4 transmission interface, a HDMI 1.1 transmission interface, a HDMI 1.2 transmission interface, a HDMI 1.3 transmission interface, a HDMI 1.4 transmission interface, a HDMI 2.0 transmission interface, a HDMI 2.1 transmission interface, a Wi-Fi 1 transmission interface, a Wi-Fi 2 transmission interface, a Wi-Fi 3 transmission interface, a Wi-Fi 4 transmission interface, a Wi-Fi 5 transmission interface, a Wi-Fi 6 transmission interface, a Bluetooth 2.0 transmission interface, a Bluetooth 2.1 transmission interface, a Bluetooth 3.0 transmission interface, a Bluetooth 4.0 transmission interface, a Bluetooth 4.1 transmission interface, a Bluetooth 4.2, a Bluetooth 5.0 transmission interface, a Bluetooth 5.1 transmission interface, Bluetooth 5.2 transmission interface, a Bluetooth 5.3 transmission interface and a BLE transmission interface.

8. The dynamic adjustment system as claimed in claim 5, wherein the image capturing device further comprises a video compression unit to compress the first image and the second image, wherein the video compression unit adopts one of a DIVX video encoding standard, an AVI video encoding standard, a MJPGE video encoding standard, a MPEG-2 video encoding standard, a MPEG-4 video encoding standard, a MPEG-4.2 video encoding standard, a H.261 video encoding standard, a H.262 video encoding standard, a H.263 video encoding standard, a H.264 video encoding standard, a H.265 video encoding standard and a H.266 video encoding standard to encode the first image and the second image.

* * * * *